Aug. 25, 1964   W. BAASNER   3,145,649
FILM FEEDING, NUMBERING AND CUTTING DEVICE
Original Filed March 22, 1960   7 Sheets-Sheet 3

INVENTOR.
WILHELM BAASNER
BY
Michael S. Striker
Attorney

Aug. 25, 1964 W. BAASNER 3,145,649
FILM FEEDING, NUMBERING AND CUTTING DEVICE
Original Filed March 22, 1960 7 Sheets-Sheet 4

Fig. 5

INVENTOR.
WILHELM BAASNER
BY
Michael S. Striker
Attorney

Fig.6

Aug. 25, 1964 W. BAASNER 3,145,649
FILM FEEDING, NUMBERING AND CUTTING DEVICE
Original Filed March 22, 1960 7 Sheets-Sheet 6

INVENTOR.
Wilhelm Baasner
BY
Richard J. Striker

Aug. 25, 1964  W. BAASNER  3,145,649
FILM FEEDING, NUMBERING AND CUTTING DEVICE
Original Filed March 22, 1960  7 Sheets-Sheet 7

Fig. 7

INVENTOR.
WILHELM BAASNER

United States Patent Office 3,145,649
Patented Aug. 25, 1964

3,145,649
FILM FEEDING, NUMBERING AND
CUTTING DEVICE
Wilhelm Baasner, Munich, Germany, assignor to Agfa Aktiengesellschaft, Leverkusen-Bayerwerk, Germany
Original application Mar. 22, 1960, Ser. No. 16,753. Divided and this application Nov. 21, 1960, Ser. No. 70,542
Claims priority, application, Germany, Mar. 26, 1959, A 31,686
7 Claims. (Cl. 101—80)

The present invention relates to photographic printers.

This is a divisional application of my copending application Serial No. 16,753, filed March 22, 1960, and entitled "Photographic Printing Apparatus."

In the type of photographic printer to which the present invention relates an elongated strip of light-sensitive printing paper is fed in stepwise fashion past an exposure station and the series of prints are reproduced successively on the strip of paper as it moves in stepwise fashion past the exposure station.

Photographic printers of this type include several units which must be adjusted whenever the format of the prints is changed, which is to say whenever the size of the prints is changed. Thus, for example, such printers conventionally include a masking means for masking the paper in accordance with the size of the prints produced thereon, and also they include a cutting means for cutting the paper between a pair of prints thereon. Furthermore, they usually include an adjusting means for adjusting the advance of the paper at each step of movement thereof in accordance with the particular format. At the present time in conventional printers all of the units of this type must be separately adjusted by the operator whenever the format is changed, and the result is not only a considerable amount of time required for the adjustments to be properly carried out, but in addition the operator must acquire a certain amount of skill and experience before the printer can be properly operated.

One of the objects of the present invention is to provide a printer of the above type which makes it possible for the several adjustable units to be automatically adjusted whenever the advance of the printing paper is adjusted so that it becomes unnecessary for the operator to make an entire series of adjustments and so that relatively inexperienced people can reliably operate the printer.

Another object of the present invention is to provide a photographic printer with a structure which will automatically adjust the masking means and cutter means of the printer whenever the extent of advance of the printing paper at each step of advance thereof is regulated, these adjustments being carried out in a manner which will cause the masking means and cutter means to be adjusted in a manner harmonizing with the adjustment of the advance of the printing paper whenever the printer is manipulated so as to change the format of the prints.

In certain types of printers there is a stamping device which stamps on the prints, at the backs thereof, for example, indicia which identifies the prints, and such a stamping device is usually located just after the exposure station so that it becomes necessary to locate the cutter means on the side of the stamping device opposite from the exposure station. As a result the cutter means is necessarily positioned at a substantial distance from the exposure station, and it therefore becomes necessary to locate the cutter means at a distance from the exposure station which corresponds to a given whole number of prints on the paper so that the cutter means will operate reliably to cut the paper at the end of one print and before the next print.

A further object of the invention is to provide a photographic printer of the above type with a structure which will automatically delay the actuation of the cutter by a number of cycles of operation equal to the number of prints between the cutter and the exposure station so that the cutter will operate only after the last print of a series of prints has reached the cutter.

An additional object of the present invention is to provide a means for automatically regulating the delay in the operation of the cutter means according to the number of prints between the cutter means and the exposure station and whenever the stamping device is manually actuated so as to change the identifying indicia thereof at the beginning of a new series of prints.

Still another object of the present invention is to provide a photographic printer of the above type which will operate automatically to actuate the cutter at intervals equal to a given series of prints on the paper so that the paper will automatically be cut by the cutter means at intervals which will locate on the sections of the printing paper equal numbers of prints.

A still additional object of the present invention is to provide a photographic printer of the above type which can be adjusted so as to control the number of photographic prints on each section of the paper cut by the cutter means.

It is still another object of the present invention to provide a structure capable of accomplishing all of the above objects and at the same time composed of simple rugged elements which will operate reliably to produce the desired results.

With the above objects in view the invention includes in a photographic printer a feeder means for feeding a strip of light-sensitive paper along a given path in stepwise fashion past an exposure station where prints are successively reproduced on the paper. The feeder means is capable of being regulated, in accordance with the invention, at the will of the operator so as to regulate the stroke thereof and thus regulate the extent to which the paper is advanced at each step by the feeder means. The printer of the invention includes a masking means for masking the paper during exposure thereof as well as a cutter means for cutting the paper, and in accordance with the present invention both the masking means and the cutter means are operatively connected with the means which regulates the feeder means so as to automatically adjust the position of the cutter means and the position of the masking means in accordance with the particular stroke to which the feeder means is manually adjusted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
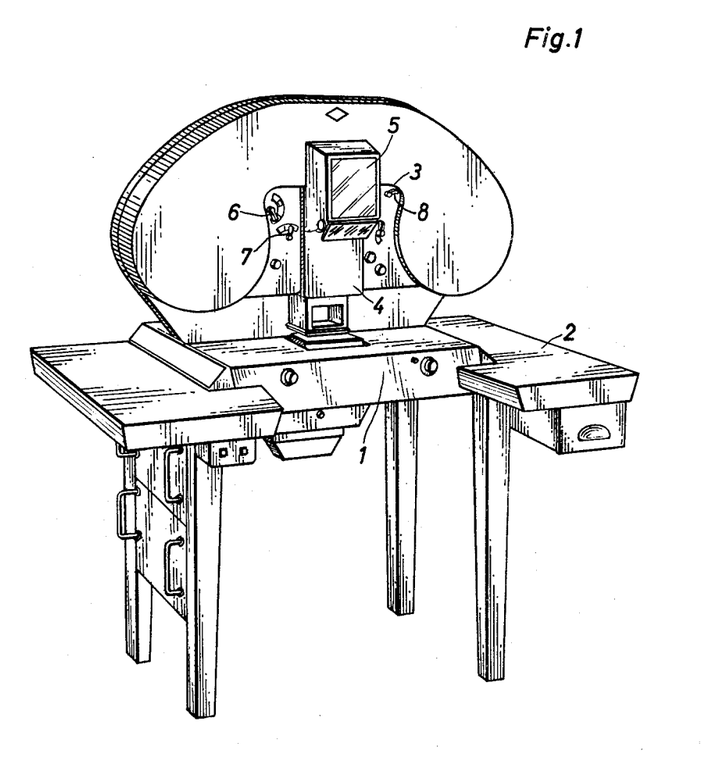
FIG. 1 is a perspective illustration of a photographic printer which includes the structure of the invention.
Figure 2:
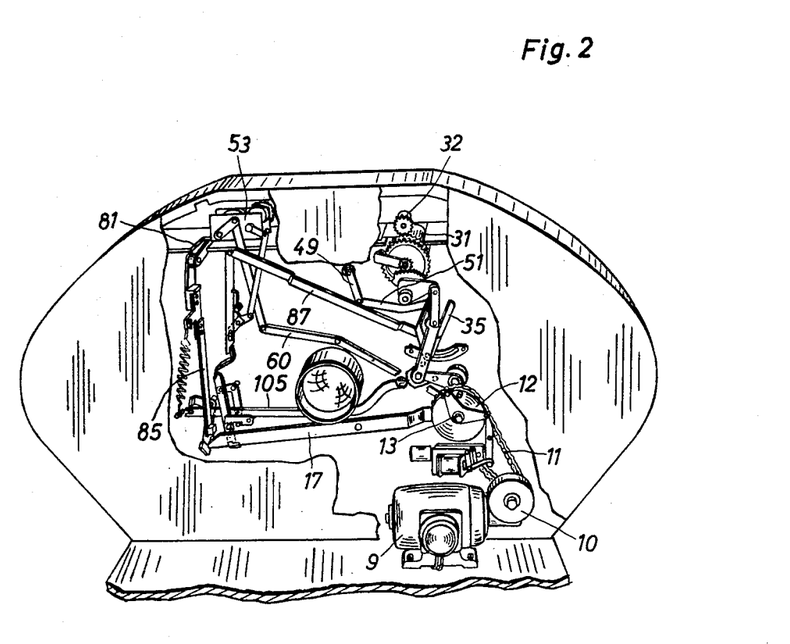
FIG. 2 shows the printer of FIG. 1 as seen from the rear with part of the housing thereof broken away so as to illustrate the structure therein.

Referring now to the drawings and to FIGS. 1 and 2 in particular, it will be seen that the photographic printer of the invention has a base plate 1 which is carried by a table 2. The printer includes a housing 3 as well as a second housing 4, this latter housing 4 housing the optical elements of the printer and including a window 5 of frosted glass or the like which allows the image to be observed. As may be seen from FIG. 1, the printer includes various manual controls accessible to the operator, and these controls are made up of a lever 6 which is manipulated for regulating the format or size of the prints, a lever 7 for allowing individual prints to be cut from the strip or a series of prints to be included in a given section of the strip, and a lever 8 which is manipulated for the purpose of changing the identifying indicia which is stamped on to the prints with a suitable stamping device.

Figure 4:
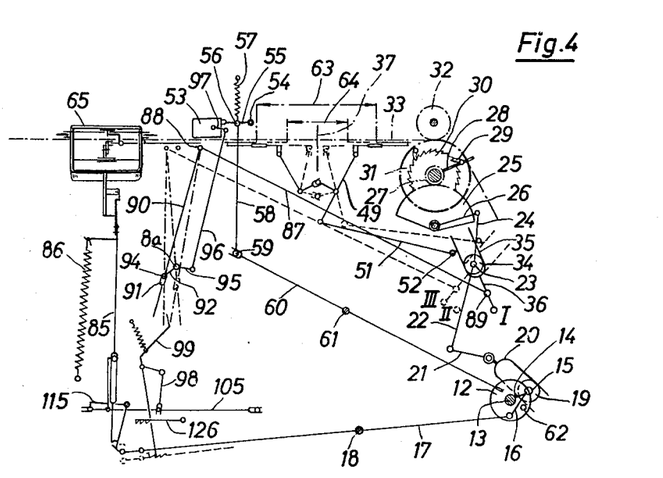
FIG. 4 is a diagrammatic illustration of the entire mechanism of the invention.

Referring now to FIGS. 2 and 4, the printer of the invention includes a motor 9 which through a worm drive 10 and a chain 11 as well as suitable sprocket wheels which are not shown rotates a friction clutch of which only the one rotary plate 12 is shown in FIGS. 2 and 4, this friction clutch being normally engaged and being provided solely for the purpose of permitting slippage whenever required. Otherwise the drive goes directly from the motor 9 through the worm drive 10 and sprocket wheels and chain 11 to the rotary plate 12 which is supported for rotation by a rotary shaft 13. This shaft 13 is supported in suitable bearings which are carried by the housing 3, and the plate 12 is fixed to the shaft 13 for rotation therewith, the other plate of the friction clutch being freely turnable on the shaft 13 and being urged into engagement with the plate 12 by suitable springs. The shaft 13 fixedly carries a crank arm 14 (FIG. 4), and this crank arm 14 carries at its outer free end a crank pin 15 which extends parallel to the shaft 13 and rotates around the axis thereof with the shaft 13. A connecting rod 16 is linked at one end to the pin 15 by being pivotally mounted thereon, and the opposite end of the connecting rod 16 is pivotally connected with the right end of an oscillatory drive lever 17, as viewed in FIG. 4. This lever 17 is supported by a stationary pivot 18 which is connected to the lever 17 intermediate the ends thereof so that during each revolution of the shaft 13 and plate 12 the lever 17 is oscillated once back and forth through a predetermined cycle. The pivot 18 is fixedly supported by the housing 3 on a suitable bracket.

The crank pin 15 carries for free rotation a roller 19 which is held by suitable collars on the crank pin 15 against axial movement with respect to the latter while being freely turnable on the crank pin 15, and this roller 19 is guided for rotary movement within an elongated bifurcated element 20 which forms part of a crank 20, 21. Instead of a bifurcated element receiving the roller 19 the crank 20, 21 may be formed with an elongated slot within which the roller 19 is guided. The crank 20, 21 is supported for pivotal movement by a stationary pivot carried by the housing 3, and the arm 21 of the crank is located on the side of the crank pivot opposite from the portion 20 which guides the roller 19. Thus, during each rotation of the shaft 13 the crank 20, 21 will be oscillated back and forth through a given angle. The free end of the crank 21 is pivotally connected to one end of an elongated link 22 whose opposite end is pivotally connected at 23 to a second link 24, the pivotal connection 23 being in the form of an elongated pivot pin 23 which extends into openings of the pair of links 22 and 24, and this pivot pin 23 forms a joint between the pair of links 22 and 24. The link 24 is pivotally connected at its end distant from the link 22 to a lever 26 which is supported for free oscillatory turning movement on a stationary shaft which is fixedly carried by the housing 3. A gear sector 25 is fixedly connected with the lever 26 and is also supported for oscillatory turning movement by the shaft which supports the lever 26, so that the gear sector 25 turns back and forth with the lever 26.. Another stationary shaft turnable supports for free rotation a pinion 27 which meshes with the gear sector 25, and the pinion 27 includes a hub to which a lever 28 is fixed, so that the lever 28 oscillates back and forth with the pinion 27. This lever 28 turnable carries a pawl 29 which is urged by an unillustrated spring into engagement with the teeth of a ratchet wheel 30 which is coaxial with the pinion 27 and also supported for free rotation by the shaft which supports the pinion 27, a suitable bracket which is carried by the housing 3 pivotally supporting a second pawl which cooperates with the ratchet wheel 30 to prevent turning thereof in a clockwise direction, as viewed in FIG. 4, so that each time the pinion 27 and shaft 28 turn in a counter clockwise direction, as viewed in FIG. 4, the pawl 29 will advance the ratchet wheel 30 through a given angle, while when the shaft 28 and pawl 29 turn back in a clockwise direction, as viewed in FIG. 4, the ratchet wheel 30 will remain stationary. This ratchet wheel 30 is fixed to a sleeve which is also fixed to a feed roller 31 against which a counter pressure roller 32 bears with a suitable spring pressure or simply by gravity, and the strip of light-sensitive paper 33 is engaged in the nip between the rolls 31 and 32. The sleeve which is common to the ratchet wheel 30 and roller 31 is supported for free rotation on the same shaft which supports the pinion 27.

Thus, the structure described above forms a feeder means which will operate on the strip 33 to feed the latter in a stepwise fashion to the left, as viewed in FIG. 4, beyond the rollers 31 and 32 past an exposure station which is divided by the central plane of symmetry 37 indicated in FIG. 4. During each rotation of the shaft 13 the rollers 31 and 32 will advance the paper 33 through one step, so that the feeder means operates in a stepwise manner to advance the paper 33 at given intervals past the exposure station.

The joint formed by the pin 23 between the links 22 and 24 includes a roller 34 which is turnably carried by the pin 23 and which is guided within an elongated guide formed by the bifurcated element 35 which is supported for turning movement around an axis which in the position of the parts shown in FIG. 4 coincides with the axis of the pivot pin 23. The manually engageable lever 6 is also turnable around this axis and is connected directly to the elongated guide 35 so that the angular position of the latter is determined by the angular position of the lever 6, and as is apparent from FIG. 1 suitable graduations are provided to cooperate with the lever 6 so as to indicate to the operator the angular position in which the lever 6 is located, and thus the guide 35 will be located in this way in a preedtermined angular position. If desired, the lever 6, instead of being connected directly with the guide 35 can be connected to the latter through a suitable gear transmission.

An elongated lever arm 36 extends from the guide 35 and is in the position I indicated in FIG. 4. Through the lever 6 the guide 35 can be turned so as to locate the lever arm 36 in position II indicated in FIG. 4, and the guide 35 may additionally be located in a third position III, as indicated in dotted lines in FIG. 4, the position II being between the positions I and III. It will be seen that depending upon the angular position of the guide 35 the angular stroke of the shaft 28 will vary, and thus the stroke of the feeder means is regulated and the extent to which the paper 33 is advanced at each step is capable of being regulated. As is apparent from FIG. 4, in the position of the parts shown in solid lines in FIG. 4 the stroke of the shaft 28 and thus the extent of advance of the paper 33 at each step, which is to say each rotation of the shaft 13, will be considerably greater than the stroke of the shaft 28 when the guide 35 and the lever 36 are in the position III indicated in dotted lines in FIG. 4, so that as the guide 35 is turned by manipulation of the lever 6 from the position I to the position II and then to the position III the stroke of the feeder means is reduced and thus the extent of advance of the paper strip 33 at each step is reduced.

Figure 5:
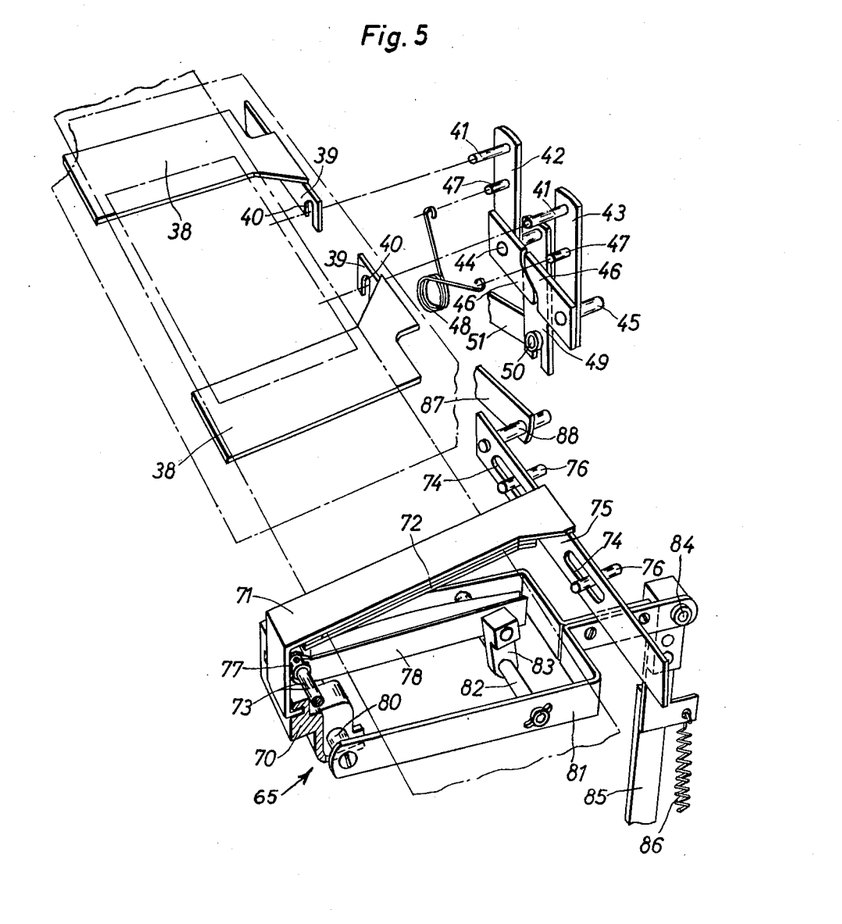
FIG. 5 is a perspective view on an enlarged scale of the masking means and cutter means of the invention.

As is shown most clearly in FIG. 5, a masking means is located beneath the paper strip 33, and this masking means includes a pair of masking members 38 which at all times are equidistantly spaced from and symmetrically arranged with respect to the central vertical plane of symmetry 37 indicated in FIG. 4. These masking plates 38 are supported for simultaneous movement through equal amounts in opposite directions back and forth toward away from each other on a suitable stationary guide member with the masking elements 38 beneath the strip of paper, and each of the masking elements 38 is provided with a downwardly directed portion 39 formed with a slot 40. A pair of pins 41 respectively extend into the slots 40, as shown in the exploded illustration of FIG. 5, and these pins 41 are respectively carried by a pair of bell-carnks 42 and 43 which are respectively supported for turning movement by a pair of stationary pivot pins 44 and 45 which are carried by the housing. The ends of the bell-cranks 42 and 43 which are located next to each other have curved camming portions 46, respectively, which directly engage each other and which cooperate with each other to guarantee that the turning movement of one bell-crank will produce an equal turning movement of the other bell-crank but in the opposite direction. A wire spring 48 has its free ends connected to a pair of pins 47 which are respectively fixed to the bell-cranks 42 and 43 so as to urge the bell-cranks in a direction which will maintain their camming portions 46 in engagement with each other at all times, and with this arrangement the retaining of the mask members 38 in symmetrical positions with respect to the plane 37 is guaranteed. The bell-crank 42 is fixed to a lever 49 which has a slotted portion receiving a pin 50 which is fixed to an elongated bar 51, so that in this way the bar 51 is pivotally connected with the lever 49, and the elongated bar 51 (FIG. 4) is pivotally connected at 52 to the guide 35, the lever 49 being pivotally supported intermediate its ends by a stationary pivot, as indicated diagrammatically in FIG. 4. Thus, with this arrangement whenever the guide 35 is turned upon manipulation of the handle 6 to a selected position I, II, III the masking means will also be adjusted, and with the above-described structure the distance between the pair of masking members 28 will always correspond automatically to the particular stroke to which the feeder means is adjusted by regulation of the angular position of the guide 35.

As was indicated above, the exposure station of the machine is located at the plane of symmetry 37 indicated in FIG. 4 and is equally divided by this plane of symmetry 37. The feeder means feeds the strip 33 in stepwise fashion past the exposure station, this exposure station having the width 64 indicated in FIG. 4 in one position of the masking means. Just subsequent to the exposure station there is located along the path of movement of the paper 33 a stamping means 53 which is capable of stamping suitable identifying indicia on the back of the strip 33. For example, the stamping device 53 may include any suitable inked member having numbers which are stamped on to the backs of the several prints to enable the latter to be identified. The stamping device 53 is of a conventional construction and is stationary, the stamping device 53 being carried by any suitable bracket of the housing 3. The stamping device includes an actuation lever 55 which is pivotally supported on a stationary pivot at 54 and which will cause the number or other identifying indicia to be stamped on to the back of the strip 33 whenever the lever 55 is pulled down through its operating stroke, a spring 57 acting on the lever 55 to turn the latter upwardly to its rest position. A pull rod 58 is pivotally connected at 56 to the bar 55 and is pivotally connected at 59 to a lever 60 which is supported at 61 intermediate its ends for oscillatory movement around a stationary axis, a pivot pin being provided at 61 to support the lever 60 intermediate its ends for turning movement, this pivot pin being fixedly carried by the housing 3. The rotary plate 12 which turns with the shaft 13 carries a pin 62, and the shaft 13 as well as the plate 12 turn in a clockwise direction, as viewed in FIG. 4. The right free end of the lever 60 is located in the path of turning movement of the pin 62, so that during each rotation of the shaft 13 and the plate therewith the pin 62 will engage and turn the lever 60 in a counterclockwise direction, as viewed in FIG. 4, so that as a result the pull rod 58 will be moved down to pull downwardly on the lever 55 in opposition to the spring 57 and thus cause actuation of the stamping device 53 so that it will stamp the identifying indicia on the strip 33.

Figure 3:
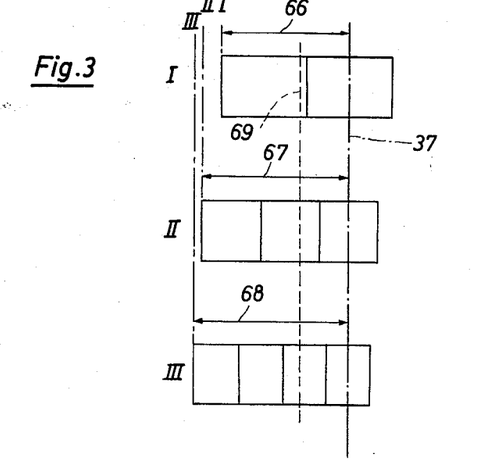
FIG. 3 is a diagrammatic illustration of the different formats capable of being produced with the particular embodiment of the invention shown in the drawings, FIG. 3 also showing diagrammatically the position of various units with respect to the printing paper.

The format of the prints on the paper 33 will always have the same width determined by the width of the strip 33. Thus, the paper 33 may have such a width that all of the prints of all of the different formats will have a width of 9 cm. The formats are changed to sizes indicated diagrammatically in FIG. 3, only with respect to the length of the successive prints. When the guide 35 is in the angular position indicated in solid lines in FIG. 4, which is position I, the format will produce prints which are, for example, 9 x 13 cm. This is the largest format in the position I capable of being produced with the illustrated embodiment, and this format is indicated diagrammatically in the upper position I in FIG. 3. In this position of the parts where the length of the format is 13 cm., the masking elements of the mask means will be spaced from each other by the distance indicated at 63 in FIG. 4, and this distance between the pair of masking elements 38 is equal to 12 cm. so as to leave a free edge portion of one-half cm. at each end of each print, and thus provide a total advance of the strip 33 at each step of 13 cm. during each revolution of the shaft 13. When the guide 33 is in position II a square format will be obtained and in this position of the parts the roller 31 together with the roller 32 will cooperate to advance the strip 33 through a distance of 9 cm. during each rotation of the shaft 13, and in position III the masking elements 38 are spaced from each other by the distance 64 indicated in FIG. 4, this distance being 5.5 cm., so that at each rotation of the shaft 13 the rollers 31 and 32 advance the strip 33 by a distance of 6.5 cm. Inasmuch as the stamping 53 is located directly after the exposure station in the direction of movement of the strip 33 along the path of movement thereof, the cutter means 65 shown diagrammatically in FIG. 4, must be spaced from the exposure station by a distance which will permit the stamping device 53 to be located between the cutter means 65 and the exposure station. The distance of the cutter means 65 from the exposure station whose plane of symmetry is indicated at 37 is indicated at 66 in FIG. 3, when the guide 35 is in position I. It will be seen that this distance 66 is equal to 1.5 cm. times the distance through which the strip 33 is advanced at each step, and since this distance in this position of the parts is equal to 13 cm., the distance 66 equal 19.5 cm. When the parts are in the position II, the cutter means 65 is located at the distance 67 from the plane of symmetry 37, as shown in FIG. 3, and this distance is equal to 2.5 times the distance through which the strip 33 is advanced at each step, and since this latter distance is 9 cm., the distance 67 is 22.5 cm. Finally, the distance of the cutter means 65 from the plane of symmetry 37 is indicated at 68 in FIG. 3, when the parts are in the position III, and it will be seen that in this position the cutter means is spaced from the plane of symmetry 37 by a distance equal to 3.5 times the distance through which the strip 33 is advanced at each step of the operation, and since this latter distance is at this time 6.5 cm., the distance 68 is equal to 22.75 cm. In order to clearly show the arrangement in FIG. 3, the distance between the positions II and III, which is to say the difference between the distance 68 and the distance 67, is exaggerated for the sake of clarity. The stamping device 53 acts at all times along the line 69 indicated in FIG. 3, so that irrespective of the position of the guide means 35, the stamping device will always act on the print which has just been made and which has just moved beyond the exposure station.

As is shown most clearly in FIG. 5, the cutter means 65 includes a fragmentarily illustrated stationary guide arm 70 which supports the carriage 71 for movement back and forth along the path of movement of the strip 33, and this carriage 71 fixedly carries the upper blade 72 of the cutter means. The carriage 71 fixedly carries a pair of sleeves 77 one of which is visible in FIG. 5, and these sleeves are axially slidable on a stationary bar 73 with respect to which the entire carriage 71 and blade 72 are slidable. The lower blade 78 is located between the pair of sleeves 77 which are fixed to the carriage 71 on the shaft 73 for turning movement about the latter, and thus the shaft 73 supports the lower cutting blade 78 for turning movement up to and back away from the stationary blade 72, while at the same time the blade 78 is compelled to move along the shaft 73 with the carriage 71 and the blade 72 so that the blades 72 and 73 retain their same positions relative to each other in the direction of movement of the strip 33. A pair of stationary pins 80, one of which is shown in FIG. 5, serve to pivotally support a bifurcated element 81 which fixedly carries a shaft 82 on which a link 83 is turnably supported and on which the link 83 is axially slidable, and this link 83 is connected at its top end to the lower blade 78. The carriage 71 is fixed with an elongated plate 75 which extends parallel to the path of movement of the strip 33, and this plate 75 is formed with a pair of slots 74 through which a pair of stationary pins 76 extend, so that these pins also contribute to the support of the cutter means for movement back and forth in the direction of movement of the strip 33. The free end of the fork 81 is pivotally connected at 84 to the upper end of a push bar 85 which is urged downwardly by its spring 86. Actually the spring 86 is connected, as shown in FIG. 5, to one end of a bracket 85a which is fixed to a block which carries the pivot pin 84, and this bracket 85a (FIG. 6a) is made of a thin springy metallic material so that it also acts as a leaf spring, this leaf spring being fixed to the upper end of the bar portion of the push bar 85. The leaf spring can have its position longitudinally of the bar 85 adjusted with respect to the block which is connected directly to the fork 81, so that in this way the length of the push bar 85 may be adjusted.

Figure 6:
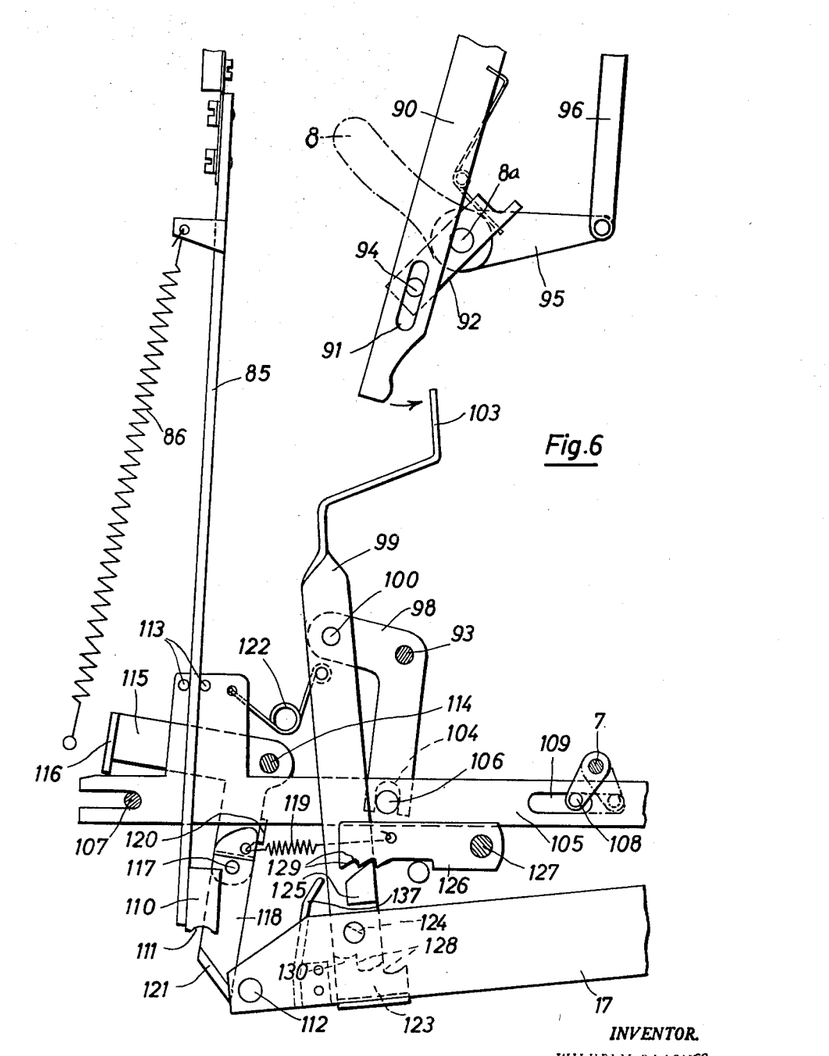
FIG. 6 is a fragmentary illustration on an enlarged scale of a structure which will automatically delay actuation of the cutter means in a predetermined manner.
Figure 6A:
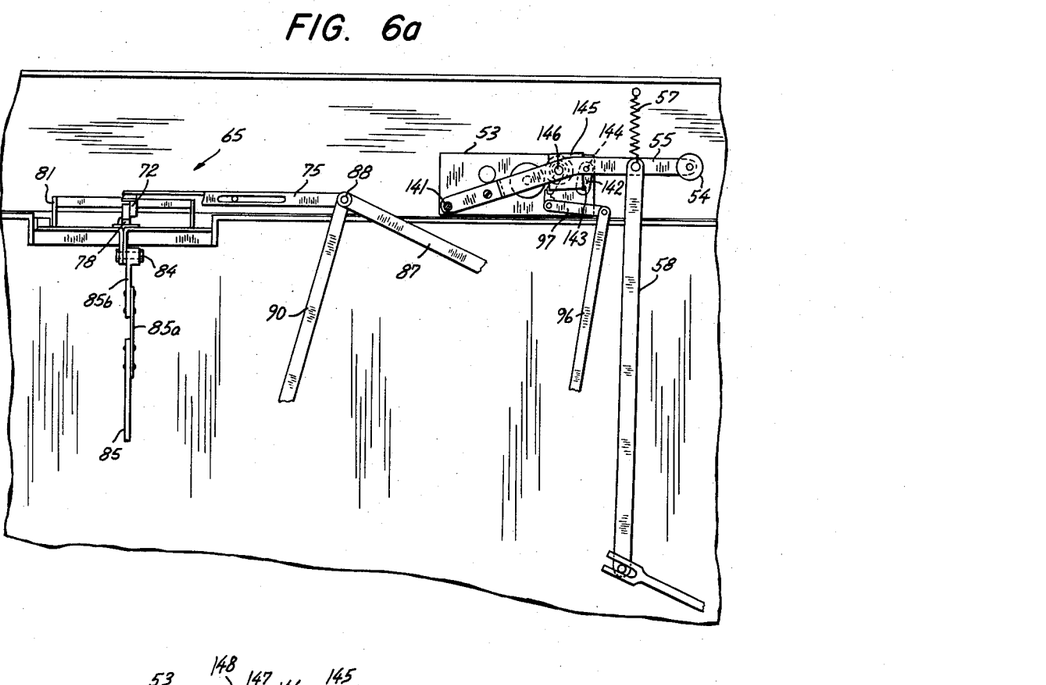
FIG. 6a is a fragmentary elevation illustrating the arrangement of a cutter means and stamping means.

An elongated bar 87 which is fragmentarily illustrated in FIG. 5 is connected at its upper end pivotally to a pin 88 which is fixedly carried by the plate 75, and as is indicated in FIGS. 4 and 6a, this bar 87 is connected at its end distant from the cutter means 65 pivotally to the lever arm 36 of the guide 35, so that when the latter is turned upon manipulation of the layer 6 to any of the above-described positions the cutter means 65 will be shifted along the path of movement of the strip 33 to the positions indicated in FIG. 3 and described above. In this way the structure of the invention will not only automatically adapt the masking means to the stroke to which the feeder means is regulated, it will also position the cutter means 65 automatically in accordance with the stroke of the feeder means so as to cut the strip at the vertical lines I, II, III shown in FIG. 3 depending upon the angular position of the guide 35.

As is indicated in FIG. 4, a lever means formed by a lever 90 is also pivotally connected to the pin 88, and as is shown in FIG. 6, this lever 90 is formed adjacent its bottom end with a longitudinal slot 91 receiving a pin 94 which is fixed to a lever 92 which is in turn fixed to the manually operable lever 8 for turning movement with the latter, this lever 8 being actuated to change the indicia of the stamping device 53, as pointed out above.

The pin 8a (FIGS. 4 and 6) which fixedly carries the lever 92 as well as the manually engageable lever 8 is supported by the front wall of the housing 3 for rotary movement, and this pin 8a fixedly carries a second lever 95 which is pivotally connected at its free end to an elongated link 96. The upper end of the link 96 is pivotally connected to the free end of a lever 97 of the device 53, and whenever the lever 8 is turned by the operator through a predetermined stroke the lever 97 will be turned so as to actuate a counter in the device 53 for increasing by 1 the number which is stamped on the strip 33 by the device 53 whenever the latter is actuated by downward movement of the lever 55 in the manner described above.

Referring to FIG. 6a it will be seen that the lever 55 is pivotally connected at 141 to the housing of the stamping device 53, and a lever 142 is pivotally connected at its bottom end, as viewed in FIG. 6a, by a pin 143 also to the housing of the device 53, this lever 142 being connected by a pin 144 pivotally to a substantially U-shaped support 145 for the rotary type carriers (FIG. 6b) which carry the indicia which is stamped on the printing paper. These rotary indicia carriers 147 are supported by a shaft 146 which extends between and is supported by the side walls of the carrier 145, and this shaft 146 also extends turnably through the lever 55. When this lever is turned downwardly, in response to a downward pull of the link 58, as described above, the carrier 145 turns down toward the printing paper, the carrier 145 turning approximately through an angle of 90° at this time. The carrier 145 turns in a counterclockwise direction, as viewed in FIGS. 6a and 6b, around the pivot pin 144 in response to the downward movement of the shaft 146 during downward movement of the lever 55. The arrangement is such that during the initial part of the turning movement of the carrier 145 it turns through a relatively large portion of its total angular movement at a relatively fast rate while just before the actual stamping, when the pins 141, 144, and 143 are practically in line with each other in a common plane, the carrier 145 moves in a straight line down into engagement with the paper.

Figure 6B:
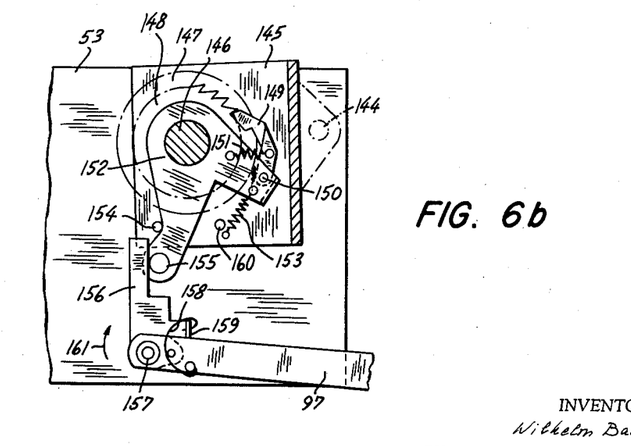
FIG. 6b is a fragmentary sectional side elevation showing details of the stamping means.

FIG. 6b shows the details for advancing the type carriers 147 which are turnable on the shaft 146. Each wheel 147 is fixed with a ratchet wheel 148, and in the first ratchet wheel of the first carrier 147 a pawl 149 engages, this pawl 149 being pivotally connected by a pin 150 to a bell crank 152 which is turnable about the shaft 146, and a spring 151 is connected to the bell crank 152 and the pawl 149 for urging the latter into engagement with the ratchet 148. A spring 153 is connected to the bell crank 152 for urging the latter in a clockwise direction, as viewed in FIG. 6b, into engagement with a pin 154 fixedly carried by the carrier 145 to which the end of spring 153 distant from the lever 152 is also connected. The lever 152 carries a pin 155 which is engaged by a lever 156 which is pivotally connected by a pin 157 to the free end of the lever 97, this pin 157 being carried by the housing of the device 53 so that the lever 97 and the lever 156 are pivotally connected to each other and to the housing of the stamping device by the pin 157. A spring 158 engages a projection of the lever 97 and a lug 159 of the lever 156 for urging the latter to turn in a clockwise direction around the pin 157, as viewed in FIG. 6b, and the lug 159 overlies the upper edge of the lever 97 so as to limit the extent to which the lever 156 can turn in a clockwise direction relative to the lever 97, this lug 159 normally engaging the upper edge of the lever 97. The carrier 145 also carries a pin 160 in the path of counterclockwise turning of the lever 152 away from the pin 154 so as to limit the extent to which the lever 152 can turn about the shaft 146.

When an order is changed so that the identifying number is also to be changed the lever 97 turns in a clockwise direction about the pin 157, as shown by the arrow 161 in FIG. 6b, and the lever 156 follows the turning lever 97 as a result of the action of the spring 158 which is stronger than the spring 153, so that until the lever 152 engages the pin 160 there is no relative turning between the levers 97 and 156, these levers turning as a unit at this time, and of course the lever 156 by engaging the pin 155 advances the bell crank 152 in opposition to the spring 153 toward the pin 160. When the lever 97 continues to turn somewhat after the lever 152 engages the pin 160 the spring 158 yields and the lever 156 remains stationary. The counterclockwise turning of the bell crank 152 at this time is transmitted through the pawl 149 to the ratchet wheel 148 and the indicia-carrying wheel 147 connected thereto so that this wheel 147 will be advanced by a distance of one tooth to bring the next number, for example, into position to be stamped on the printing paper. After the wheel 147 has been turned through 360° the adjoining wheel 147 for the digits in the tens position, for example, will be turned so as to bring the next digit of this wheel in the stamping position, as is well known in all tens transferring devices of assemblies of totalizing wheels.

As may be seen from FIG. 6, a bell crank 98 is located beneath the lever 90 and is supported for turning movement by a stationary pivot pin 93 which is carried by the housing 3. This bell crank 98 forms part of a delay means shown in FIG. 6 and described below, and this delay means will automatically delay the actuation of the cutter means 65. The upper arm of the bell crank 98 pivotally carries at 100 a control lever 99 of the delay means, and this lever 99 is urged to turn in a counterclockwise direction, as viewed in FIG. 6, around the pivot pin 100, by a spring 122. The upper free end 103 of the control lever 99 is located in the path of turning of the lower free end of the lever 90. Thus, whenever the handle 8 is turned to change the indicia of the stamping device 53, the lever 90 will also be turned and it will engage the end 103 of the lever 99 so as to turn the latter, and in this way the delay means is actuated whenever the stamping device has its indicia changed by actuation of the lever 8. The lever 8 is always turned through the same angle by the operator in order to turn the lever 97 and change the indicia of the stamping device 53. However, the control lever 99 will not always be turned through the same angle upon actuation of the lever 8. The reason for this is that the lever 90 will be located in different positions depending upon the position of the cutter means 65 which is controlled by the angular position of the guide 35. Thus, as is clearly apparent from FIG. 4, when the guide 35 is in position I, the bottom end of the lever 90 will engage the control lever 99 to turn the latter through an angle considerably greater than the angle through which the control lever 99 is turned when the parts are in the position III, and in this way the angular position of the guide 35 also serves to control in a fully automatic manner the extent to which the control lever 99 is turned upon actuation of the lever 8. Thus, the structure operates automatically to control the extent to which the actuation of the cutter 65 is delayed. When the parts are in position I, the actuation of the cutter means will be delayed by one stroke of the feeder means, so that the cutter will cut the strip at the right end of the left print shown at the upper part of FIG. 3. When the parts are in position II, the feeder means will advance the strip 33 through two steps before the cutter means will cut across the strip, and when the parts are in position III the feeder means will advance the strip 33 through three steps before the cutter means will be actuated to cut the strip, and in this way the machine operates automatically to delay actuation of the cutter means in accordance with the particular format so that the cutter means will automatically cut the strip at the end of the last print before actuation of the lever 8 to change the indicia of the device 53 for causing the latter to provide identifying indicia for the next series of prints.

The lower end of the bell crank 98 of the delay means is formed with a notch 104 which receives a pin 106 which is fixed to a substantially horizontal control bar 105 which is supported for horizontal movement to the right and left. The control bar 105 is formed with a pair of elongated slots or cutouts which respectively receives stationary pins 107, so that in this way the control bar 105 is supported for horizontal movement. The spring 122 shown in FIG. 6 is connected at its left end to a lug which is integral with and extends from the control bar 105, and this spring 122 serves to urge the control bar 105 to the left, as indicated in FIG. 6, to the rest position of the control bar 105 which is indicated in FIG. 6. This control bar 105 is shiftable to the right from its rest position shown in FIG. 6 to an active position where the control bar positions the push bar 85 so that it will be in an operating position ready to be pushed so as to actuate the cutter means. The control lever 7 which is accessible to the operator at the front of the machine is fixed to a lever which fixedly carries a pin 108 located in an elongated slot 109 formed in the bar 105, and when the lever 7 is turned so as to move the pin 108 from its solid line position shown in FIG. 6 to the right to its dotted line position shown in FIG. 6, the bar 105 will be shifted to the right to its active position and will be maintained by the pin 108 in its active position, so that as long as the lever 7 is placed by the operator in a position which locates the control bar 105 in its active position the push bar 85 will be actuated at each cycle of operations and thus each print will be separately cut from the strip. When it is desired to cut sections of the strip which contain a plurality of prints, the lever 7 is positioned so as to locate the pin 108 in the solid line position indicated in FIG. 6.

The actuation of the cutter means is derived from the oscillatory drive lever 17 referred to above. A suitable means is provided for transmitting the turning movement of the lever 17 in one direction to the push bar 85 so as to push the latter and actuate the cutter means. This means includes the block 110 (FIG. 6) fixed to the bottom end of the push bar 85 and having a lower concave surface 111 forming part of a cylinder, for example. The left free end of the drive lever 17 fixedly carries a pin 112 which is adapted to engage the seat 111 so as to act through the block 110 on the bar 85 to push the latter upwardly in opposition to the spring 86 and thus the cutter means is actuated. The lug of the control bar 105 which is connected to the spring 122 fixedly carries a pair of pins 113 (FIG. 6) between which the push bar 85 is located. When the bar 105 is shifted to the right, as viewed in FIG. 6, to its active position, the bar 85 will turn, since it is connected by the leaf spring described above to the fork 81, in a counterclockwise direction, as viewed in FIG. 6, and the block 110 will become located above the pin 112 in the path of turning movement thereof. This pin 112 is fixed to the drive lever 17 for oscillatory movement therewith and during the next upward turning of the left free end of lever 17, the pin 112 will engage the block 110 and push the bar 85 upwardly in order to actuate the cutter.

However, when the bar 105 is in the rest position shown in FIG. 6, the bar 85 is displaced to the left, as viewed in FIG. 6, from its operating position so as to locate the block 110 out of the path of turning movement of the pin 112, and thus the cutter will not be actuated as long as the bar 105 is in its rest position shown in FIG. 6. Of course, as was pointed out above, as long as the lever 7 has been actuated so as to locate the pin 108 of FIG. 6 in the dotted line position thereof, the bar 105 is retained in its active position and the block 110 is thus located at this time over the pin 112 so that the cutter will be actuated at each oscillation of the lever 17 to cut the individual prints from the strip, as indicated above.

The delay means for delaying the actuation of the cutter includes in addition to the structure described above a stop lever in the form of a bell crank 115 which is pivotally supported by a stationary pivot pin 114. This bell crank 115 has at its upper left free end, as viewed in FIG. 6, a lug 116 which is adapted to move down to the elevation of the left free end of the lever 105 as soon as this lever 105 advances to the right to its active position, as viewed in FIG. 6. A spring 119 is connected at one end of the bell crank 115 to urge the latter in a counterclockwise direction, as viewed in FIG. 6, so as to locate the lug 116 in its blocking position as soon as the left free end of the control bar 105 moves to the right, as viewed in FIG. 6, beyond the lug 116, and as long as this lug 116 is not again raised to the elevation shown in FIG. 6, the bar 105 cannot return to its rest position and the push bar 85 will be maintained in its operating position where it will be actuated by the lever 117 in the manner described above. The bottom end of the bell crank 115 is pivotally connected at 117 to a lever 118 which has an upper end portion urged into engagement with a lug 120 of the bell crank 115 by the spring 119 so that this spring acts on the bell crank 115 through the lever 118. This lever 118 terminates at its bottom end in an inclined lug 121 which extends toward the free end of the lever 17 shown in FIG. 6. The upper face of the inclined lug 121 is located in the path of turning movement of the pin 112. With this arrangement it is apparent that the lever 118 can turn in a counterclockwise direction with respect to the lever 115 in opposition to the spring 119 since the top end of the lever 118 can turn away from the lug 120 of the lever 115. However, when the lever 118 is urged to turn in a clockwise direction about the pivot pin 117, the top end of the lever 118 will engage the lug 120 so that at this time the bell crank 115 will necessarily turn with the lever 118.

The lever 17 is not shown in its lowermost position in FIG. 6. During its downward movement the lever 17 will move down to an end position below that shown in FIG. 6. Assuming now that the control bar 105 has been moved to the right to its active position, the spring 119 will immediately turn the bell crank 115 so as to locate the lug 116 thereof at the elevation of the left end of the bar 105 so as to block the latter against return to its rest position. At this time the push bar 85 is displaced to the right, as viewed in FIG. 6, to its operating position so that the block 110 is aligned with the pin 112. During the next upward movement of the lever 17 the pin 112 will move along the underside of the lug 121 so as to turn the lever 118 in a counterclockwise direction away from the lug 120, so that the bell crank 115 will remain in its lower blocking position, and during the continued upward movement of the lever 17 the pin 112 thereof will engage the seat 111 of the block 110 so as to push the bar 85 upwardly and actuate the cutter. During the downward movement of the lever 17 the spring 86 will return the push bar 85 to its lowermost position where the cutter is not operated, and during the downward movement of the lever 17 the pin 112 thereof will engage the upper side of the lug 21 so as to urge the lever 118 to turn in a clockwise direction, but at this time the top end of the lever 118 will cooperate with the lug 120 so as to turn the entire bell crank in a clockwise direction, and thus the lug 116 will be turned upwardly away from the left end of the control bar 105 so that this control bar can now be moved by the spring 122 back to its rest position shown in FIG. 6, and thus the push bar 85 is displaced to the left to the position shown in FIG. 6 where it will not be actuated on the next upward movement of the lever 17. Of course, where the pin 108 is in its right position shown in dotted lines in FIG. 6, the bell crank 115 simply oscillates back and forth during each up and down movement of the lever 17 and the bar 105 remains in its active position.

As was pointed out above, the lever 99 which is the control lever of the delay means will be turned in a clockwise direction, as viewed in FIG. 6, by the lower end of the lever 90 through different angles depending upon the position in which the outer cutter means 65 is located by the guide 35. This turning of the control lever 99 will displace the latter through a given angle from a given starting position, and the delay means includes a structure which will automatically step the lever 99 back to starting position of the lever 99. In view of this fact equal to the number of operation of the feeder means before the cutter means is to be actuated for cutting the strip 33. This means for stepping the lever 99 in a counter-clockwise direction, as viewed in FIG. 6, back to its starting position includes a rack 126 which is shown in FIG. 6 pivotally supported by a pin 127 which is stationary, and it will be noted that the end of the spring 119 distant from the bell crank 115 is connected to the rack 126. The teeth of the rack 126 are directed downwardly toward the teeth of a second rack 123 which is carried by the lever 99 at its bottom end. The lever 99 fixedly carries a tooth 125 which cooperates with the teeth of the rack 126, while the lever 17 fixedly carries a tooth or projection 124 which cooperates with the teeth of the rack 123. It will be noted that the spring 122 operates on the lever 99 so as to urge the latter to turn in a counterclockwise direction, as viewed in FIG. 6, to the above-referred to starting position of the lever 99. In view of this fact the teeth of the rack 123 are provided at 128 with surfaces which extend substantially transversely to the direction of movement of the lever 99 back to its starting position, and thus the sides 128 of the teeth of the rack 123 will cooperate with the tooth 124 to be stopped by the latter, and in the same way the teeth of the rack 126 are provided with surfaces 129 which extend transversely to the direction of movement of the lever 99 back to its starting position, so that these surfaces 129 of the teeth of the rack 126 will cooperate with the tooth 125 to limit the extent to which the lever 99 is turned by the spring 122. The other sides of the teeth of the rack 126 are inclined, for example, at an angle of 30°, so that they will not interfere with the clockwise turning of the lever 99, and in the same way the upwardly directed faces of the teeth of the rack 123 carried by the lever 99 are only slightly inclined so they will not interfere with the clockwise turning of the lever 99. Moreover, as may be seen from FIG. 6, the projections or teeth 124 and 125 as well as the teeth of the racks 123 and 126 are displaced with respect to each other in such a way that when one of the projections or teeth engages one of the racks in so doing it will move the other projection or tooth away from the rack with which it cooperates and will advance this latter projection or tooth along the rack with which it cooperates so that it will be in position to engage the next tooth during the next half cycle of operation. For example, in the position of the parts shown in FIG. 6 the tooth 124 has just moved upwardly away from the next to the last tooth of the rack 123 during the upward oscillation of the lever 17. During the preceding downward oscillation when the tooth 124 engaged the next to last tooth of the rack 123, the tooth 124 moved the lever 99 downwardly through a relatively slight angle insufficient to advance the bar 105 to its active position but nevertheless sufficient to move the tooth beyond the next to the last tooth of the rack 126, and thus the spring 122 was able to advance the tooth 125 to the last tooth of the rack 126, as indicated in FIG. 6. Now when the spring 122 moves the lever 99 so as to locate the tooth 125 thereof in engagement with the last tooth of the rack 126, the rack 123 turns with the lever 99 so as to locate the crest of the last tooth 130 of the rack 123 sufficiently to the right with respect to the tooth 124 so that during the next downward movement of the lever 17 the tooth 124 will engage this last tooth 130 and thus on the next upward movement of the lever 17 release the lever 99 for movement by the spring 122 to its starting position at the right end of the teeth of the rack 126. Thus, by controlling the angle through which the control lever 99 is turned in a clockwise direction, as viewed in FIG. 6, from its starting position, it is possible to control the number of cycles of operation required to return the lever 99 to its starting position, and this stepping of the lever 99 back to its starting position is determined by the projections or teeth 124 and 125 and the racks 123 and 126 cooperating therewith, respectively.

When the lever 99 is in its starting position the tooth 125 thereof is located to the right beyond the teeth of the rack 126, and the rack 123 is located to the right beyond the tooth 124. As was mentioned above, the parts are shown diagrammatically in FIG. 4 in the position they take when set for operation with the largest format, which is a format which will produce prints having a length of 13 centimeters, and thus at this time the paper 33 will have to be advanced through one step before the cutter means will be actuated to cut from the strip the last exposed portion thereof, as was mentioned above in connection with FIG. 3. Thus, at this time, when the guide 35 is in the solid line position shown in FIG. 4, the actuation of the lever 8 will cause the lever means 90 to turn through an angle which, due to the position of the cutter means 65 will produce only a relatively small angle of turning of the control lever 99, and this will turn the lever 99 up to the position shown in FIG. 6 where the tooth 125 thereof engages the last tooth of the rack 126. Thus, with the parts in this position the feeder means will move through one cycle of operation to advance the strip 33 through one step, and then the cutter means will be automatically actuated. Thus, with the parts in the position of FIG. 6, when the left free end of the lever 17 turns upwardly, the pin 112 will not engage the block 110 and the cutter will not be actuated. During the next downward movement of the lever 17 the tooth 124 thereof will engage the last tooth 130 of the rack 123. It will be noted that this tooth 130 of the rack 123 extends to an elevation substantially higher than the remaining teeth of the rack 123, and thus during this downward movement of the lever 17 the control lever 99 will be moved downwardly through a distance greater than when the tooth 124 engages any of the other teeth of the rack 123, and thus at this time only will bell crank 98 be turned through an angle sufficient to displace the control bar 105 to the right, as viewed in FIG. 6, through a distance sufficient to locate the control bar 105 in its active position, and of course the lock lever 115 operates automatically to maintain the control bar 105 in its active position, until after the cutter means is actuated in the manner described above.

On the other hand, when the guide 35 is in position III, the turning of the lever 90 upon actuation of the lever 8 will cause the control lever 99 to be turned from its starting position through such an angle that the teeth 125 are located to the left beyond the teeth of the rack 126, and at this time it will be necessary for the lever 99 to be stepped through six half cycles before it will again reach its starting position, and of course at this time the feeder means will operate through three cycles to advance the paper 33 through three steps before the cutter means will be actuated to cut across the strip.

Figure 7:
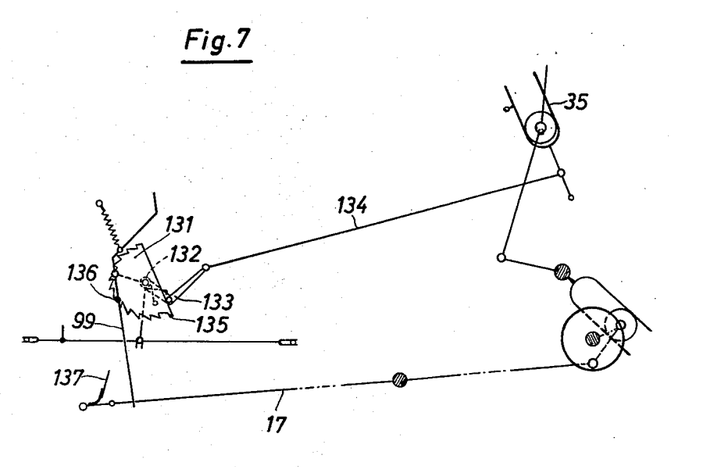
FIG. 7 is a diagrammatic illustration of a structure which will automatically actuate the cutter means at intervals which will produce a predetermined number of prints on each section of printing paper which is cut by the cutter means on the strip of printing paper.

In some cases it is desirable to automatically actuate the cutter means at regular intervals so as to produce elongated strips having a desired number of prints thereon, and FIG. 7 illustrates a structure according to the invention which may be incorporated into the structure described above for automatically actuating the cutter means at regular intervals, which is to say after a certain predetermined number of prints have been reproduced on the strip.

Referring to FIG. 7 it will be seen that there is a stationary pin 93 which is fixedly carried by the housing, for example, and this pin 93 is in fact the same pin 93 shown in FIG. 6 and supports the bell crank 98 in the manner described above, so that when this bell crank 98 is turned in a counterclockwise direction it will advance control bar 105 to its active position. In the embodiment of the invention which is illustrated in FIG. 7, the pin 93 also serves to turnably support a segment 131 of a ratchet means, which is to say a substantially semicircular section of a ratchet wheel, and a wire spring 132 is coiled around the pin 93 and is connected to a pin which is fixed to the ratchet means 131 so as to urge the latter to turn in a counterclockwise direction, as viewed in FIG. 7. The other end of the spring 132 engages an arm of a substantially L-shaped lever 133 which is also supported for turning movement by the pin 93, and this lever 133 acts as a stop lever and carries a projection which is engaged by an edge of the segment 131 in the position of the part shown in FIG. 7, the spring 132 urging the segment 131 to turn in a counterclockwise direction to the position shown in FIG. 7, where it engages the stop projection of the stop lever 133. The free end of the lever 133 is pivotally connected to one end of an elongated link 134 which is pivotally connected at its opposite end to the lever arm 36 of the guide 35, so that in accordance with the angular position of the guide 35 the stop lever 133 will be positioned so as to limit the extent to which the ratchet means 131 can be turned by the spring 132. When the guide 35 is turned to the positions II or III, the lever 133 will be turned in a counterclockwise direction around the pin 93 so that the spring 132 will be able to turn the ratchet 131 beyond the position thereof shown in FIG. 7 until it engages the stop projection of the stop lever 133. The structure operates in a manner described below so as to step the teeth of the ratchet 131 in a clockwise direction, as viewed in FIG. 7, around the pin 93 in opposition to the spring 132, and the successive teeth of the ratchet 131 will cooperate with a tooth 136 carried by the lever 99 so that the spring 132 cannot return the ratchet 131 back to its starting position. The ratchet 131 terminates in a tooth 135 whose shape is such that when the last tooth 135 approaches the tooth 136 the spring 122 (FIG. 6) can turn the lever 99 to the angular position where the tooth 130 of the rack 123 is located beneath the projection 124 of the lever 17, so that during the next downward movement thereof the lever 99 will be moved downwardly through a distance sufficient to turn the bell crank 98 through an angle sufficient to move the bar 105 to its active position described above. Thus, as soon as the last tooth 135 of the ratchet 131 reaches the projection 136 carried by the lever 99, the cutter will automatically be actuated, and thus by controlling the number of teeth of the ratchet 131 which must be stepped along the tooth 136 before the last tooth 135 reaches the tooth 136, it is possible to control the number of prints on the section of the strip which is cut therefrom by the cutter means. The lever 17 carries a pawl 137 which during the upward oscillation of the lever 17 at its left end, as viewed in FIG. 7, moves into engagement with the ratchet 131 to step the latter in a clockwise direction through a distance of one tooth so that the next tooth will engage the tooth 136, as described above, and in this way at each oscillation of the lever 17 the ratchet 131 will be stepped around in a clockwise direction, as viewed in FIG. 7, through a distance of one tooth. The link 134 by its connection with the guide 35 enables the structure of FIG. 7 to be automatically regulated to provide on substantially equal lengths of the strip 33 a desired number of prints of the desired format. The guide 35 is shown in FIG. 7 in the position it takes to provide the largest format which is to say prints having the length of 13 centimeters. Thus, the position of the guide 35 automatically controls the angle of the stop lever 133 so that the spring 132 will turn the ratchet 131 to a position where six teeth of the ratchet are required to be stepped past the tooth 136 before the cutter means will be actuated. Thus with the parts in the starting position shown in FIG. 7 there will be six cycles of operation before the cutter means will be actuated. Of course, when the last tooth 135 reaches the tooth 136, the lever 99 will be in the angular position which will enable the lever 17 by cooperation of the tooth 124 with the tooth 130 to move the lever 99 down so as to cause the cutter to be actuated in the manner described above, and also, during this downward movement of the lever 99 the tooth 136 thereof is moved a sufficient distance away from the ratchet 131 to enable the latter to be automatically returned to its starting position by the spring 132, so that upon return of the lever 99 the tooth 136 thereof will automatically engage the proper tooth of the ratchet 131 to enable the device to automatically continue to produce the next series of prints equal to the same number as the preceding series which has been located on the section of the strip cut from the remainder of the strip.

With the parts in the position of FIG. 7, the several prints will have a length of 13 centimeters, and at this time there are six cycles of operation required before the cutter means will be actuated, so that the length of the strip section which is cut by the cutter means will be equal to six times thirteen or 78 centimeters. When the guide 35 is turned to position II, the lever 133 is turned in a counterclockwise direction around the pin 93 to a different position which will cause the spring 132 to return the ratchet 131 to a starting position which will require more teeth to be stepped past the tooth 136 before the cutter will be actuated, and in fact in this case nine cycles of operation will be required before the cutter means will be automatically actuated, and since each of the prints is 9 centimeters long, the section of the strip which will be automatically cut at this time will be 81 centimeters long. In the third position, which is to say when the guide 35 is in position III indicated in FIG. 7, the stop 133 will have such a position that twelve cycles of operation will be required before the cutter will be automatically actuated, and since each print has a length of 6.5 centimeters at this time, the strip which is automatically cut will have twelve prints thereon each equal to 6.5 centimeters in length, so that the entire strip is twelve times 6.5 or 78 centimeters again, and thus in position III the sections of the strip will have the same length as when the guide means 35 is in position I.

Of course, if the lever 7 is actuated to locate the pin 108 in the dotted line position of FIG. 6, the individual prints will still be cut from the strip, even with the device of FIG. 7, but assuming that the lever 7 is turned to locate the pin 108 in its solid line position of FIG. 6, then the structure of FIG. 7 will automatically operate to cut the strip into sections which are substantially of equal length and which contain a predetermined number of prints according to the particular format, as described above. Also, as was described above, as soon as one actuation of the cutter means has taken place the ratchet 131 will be automatically returned to its starting position so that the next series of prints will be produced on the next strip section in a fully automatic manner.

Returning to FIG. 3, when the guide 35 is turned by the lever 6 so as to change from one format to another format, it is best to allow the machine to operate without making any reproductions through two cycles. Hereagain, in order to eliminate hand operation it is possible to actuate upon turning of the guide 35 an electrical contact which is located in the circuit of the driving motor and which will open automatically only after the machine has moved through two cycles of operation. Such a control can take place either electrically or mechanically.

Also, it is possible, where desired, to control the stamping device 53 from a delay means such as that which controls the cutter means.

It will be understood that each of the elements described above, or two or more together, may also find a useful application in other types of photographic printers differing from the types described above.

While the invention has been illustrated and described as embodied in automatic photographic printers, it is not intended to be limited to the details shown, since various modifications and structural changes may be made without departing in any way from the spirit of the present invention.

Without the further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a photographic printer, in combination, support means; cutter means carried by said support means for cutting across a strip of photographic printing paper between a pair of prints thereon, said support means supporting said cutter means for shifting movement longitudinally of the strip of paper so that the location of said cutter means relative to the paper can be adjusted; a push bar operatively connected with said cutter means for actuating the latter when said push bar is pushed; an oscillatory driving lever supported by said support means for oscillatory movement back and forth through a given angle; means for coupling said drive lever to said push bar when the latter is in an operating position so that said drive lever will engage and push said push bar to actuate said cutter means; an elongated control bar supported for shifting movement by said support means and having a rest position where said control bar engages said push bar and locates the latter away from its operating position so that as long as said control bar is in its rest position said drive lever cannot cooperate with said push bar to push the latter and actuate said cutter means, said control bar being shiftable from its rest position to an active position where said push bar is located by said control bar in its operating position to be engaged and pushed by said drive lever irrespective of the adjusted position of said cutter means relative to the paper; a bell crank supported for turning movement by said support means and operatively connected to said control bar for shifting the latter from its rest to its active position when said bell crank is turned through a given angle; a control lever turnably carried by said bell crank; and a pair of projections carried by said control lever and said drive lever, respectively, so that when said projection of said control lever is in the path of movement of said projection of said drive lever the movement of the latter will be transmitted through said pair of projections to said control lever to displace the latter and turn said bell crank for advancing said control bar to its active position so as to place said push bar in its operating position to be actuated by said drive lever.

2. For use in a photographic printer, in combination, support means; cutter means carried by said support means for cutting across a strip of photographic printing paper between a pair of prints thereon, said support means supporting said cutter means for shifting movement longitudinally of the strip of paper so that the location of said cutter means relative to the paper can be adjusted; a push bar operatively connected with said cutter means for actuating the latter when said push bar is pushed; an oscillatory driving lever supported by said support means for oscillatory movement back and forth through a given angle; means for coupling said drive lever to said push bar when the latter is in an operating position so that said drive lever will engage and push said push bar to actuate said cutter means; an elongated control bar supported for shifting movement by said support means and having a rest position where said control bar engages said push bar and locates the latter away from its operating position so that as long as said control bar is in its rest position said drive lever cannot cooperate with said push bar to push the latter and actuate said cutter means, said control bar being shiftable from its rest position to an active position where said push bar is located by said control bar in its operating position to be engaged and pushed by said drive lever irrespective of the adjusted position of said cutter means relative to the paper; a bell crank supported for turning movement by said support means and operatively connected to said control bar for shifting the latter from its rest to its active position when said bell crank is turned through a given angle; a control lever turnably carried by said bell crank; a pair of projections carried by said control lever and said drive lever, respectively, so that when said projection of said control lever is in the path of movement of said projection of said drive lever the movement of the latter will be transmitted through said pair of projections to said control lever to displace the latter and turn said bell crank for advancing said control bar to its active position so as to place said push bar in its operating position actuated by said drive lever, said projection of said control lever being the last of a series of rack teeth carried by said control lever and extending to an elevation higher than the remainder of said rack teeth so that when said projection of said drive lever engages the last of said series of rack teeth said control lever will be moved through a distance greater than it is moved by engagement of said projection of said drive lever with the remainder of said rack teeth; a second rack carried by said support means with its teeth directed toward the teeth of the rack carried by said control lever and the teeth of said second rack being displaced with respect to the teeth of the rack carried by said control lever; and a tooth carried by said control lever for cooperating with the teeth of said second rack, said tooth of said control lever engaging a tooth of said second rack to position said projection of said drive lever for engagement with the tooth of a rack of said control lever subsequent to the tooth thereof previously engaged by said projection of said drive lever and said projection of said drive lever cooperating with the teeth of said rack carried by said control lever for positioning said tooth of said control lever for engagement with a tooth of said second rack subsequent to said tooth previously engaged by the tooth of said control lever, so that said control lever will be advanced in order to step the last of the series of teeth of the rack carried by said control lever toward said projection of said drive lever.

3. For use in a photographic printer, in combination, support means; cutter means carried by said support means for cutting across a strip of photographic printing paper between a pair of prints thereon, said support means supporting said cutter means for shifting movement longitudinally of the strip of paper so that the location of said cutter means relative to the paper can be adjusted; a push bar operatively connected with said cutter means for actuating the latter when said push bar is pushed; an oscillatory driving lever supported by said support means for oscillatory movement back and forth through a given angles; means for coupling said drive lever to said push bar when the latter is in an operating position so that said drive lever will engage and push said push bar to actuate said cutter means; an elongated control bar supported for shifting movement by said support means and having a rest position where said control bar engages said push bar and locates the latter away from its operating position so that as long as said control bar is in its rest position said drive lever cannot cooperate with said push bar to push the latter and actuate said cutter means, said control bar being shiftable from its rest position to an active position where said push bar is located by said control bar in its operating position to be engaged and pushed by said drive lever irrespective of the adjusted position of said cutter means relative to the paper; a bell crank supported for turning movement by said support means and operatively connected to said control bar for shifting the latter from its rest to its active position when said bell crank is turned through a given angle; a control lever turnably carried by said bell crank; a pair of projections carried by said control lever and said drive lever, respectively, so that when said projection of said control lever is in the path of movement of said projection of said drive lever the movement of the latter will be transmitted through said pair of projections to said control lever to displace the latter and turn said bell crank for advancing said control bar to its active position so as to place said push bar in its operating position to be actuated by said drive lever, said projection of said control lever being the last of a series of rack teeth carried by said control lever and extending to an elevation higher than the remainder of said rack teeth so that when said projection of said drive lever engages the last of said series of rack teeth said control lever will be moved through a distance greater than it is moved by engagement of said projection of said drive lever with the remainder of said rack teeth; a second rack carried by said support means with its teeth directed toward the teeth of the rack carried by said control lever and the teeth of said second rack being displaced with respect to the teeth of the rack carried by said control lever; a tooth carried by said control lever for cooperating with the teeth of said second rack, said tooth of said control lever engaging a tooth of said second rack to position said projection of said drive lever for engagement with the tooth of a rack of said control lever subsequent to the tooth thereof previously engaged by said projection of said drive lever and said projection of said drive lever cooperating with the teeth of said rack carried by said control lever for positioning said tooth of said control lever for engagement with a tooth of said second rack subsequent to said tooth previously engaged by the tooth of said control lever, so that said control lever will be advanced in order to step the last of the series of teeth of the rack carried by said control lever toward said projection of said drive lever; a stop lever turnably supported by said support means and having a free end portion adapted to engage an end of said control bar when the latter is in its active position to prevent return of said control bar to its rest position; spring means cooperating with said stop lever to turn the latter to a position where it will stop said control lever from return to its rest position, said spring means turning said stop lever to its position stopping said control lever in its active position as soon as said control lever reaches its active position; and means carried by said stop lever and cooperating with a part of said drive lever to be actuated thereby to be turned back to a position releasing said control bar for return to its rest position after said drive lever has actuated said push bar.

4. In a photographic printer, in combination, cutter means for cutting across a strip of light-sensitive paper between a pair of prints thereon support means supporting said cutter means for shifting movement longitudinally of the strip of paper so as to be adjustable relative thereto; a push bar operatively connected to said cutter means for actuating the latter when said push bar is pushed; an oscillatory drive lever; means transmitting movement of said said drive lever to said push bar when said push bar is in an operating position; a shiftable control bar movable from a rest to an active position and cooperating with said push bar to move the latter to its operating position when said control bar is moved from its rest to its active position, said push bar being located in its operating position by said control bar when the latter is moved to its active position, irrespective of the position of said cutter means relative to the strip of paper; means cooperating with said drive lever to be actuated thereby to move said control bar from its rest to its active position after a selected number of oscillations of said drive lever; and manually operable means cooperating with said control bar for maintaining the latter at the will of the operator in active position independently of the number of oscillations of said drive lever.

5. In a photographic printer, in combination cutter means for cutting across a strip of lightsensitive paper between a pair of prints thereon support means supporting said cutter means for movement longitudinally of the strip of paper; adjusting means operatively connected to said cutter means for selectively placing the latter in a selected one of a plurality of positions; driving means having an oscillatory driving member for driving said cutter means; coupling means for coupling said driving member with said cutter means in all of said positions, whereby said cutter means is actuated at each oscillation of said driving member, when said coupling means is closed irrespective of the adjusted position of said cutter means relative to the strip of paper; control means for controlling said coupling means; manually operable means for operating said control means; and delaying means connected with said manually operated means and said control means, which delaying means delays the operation of said control means over a predetermined number of oscillations of said driving member.

6. In a photographic printer as recited in claim 5, stamping means for stamping the same number on each print of one series of photographic prints; and switching means for switching the number of said stamping means, said switching means being connected with said manually operable means.

7. In a photographic printer as recited in claim 5 wherein said delaying means adjustable; stamping means for stamping the same number on each print of one series of photographic prints; switching means for switching the number of said stamping means, said switching means being connected with said manually operable means; and connecting means for connecting said cutter means with said manually operated means and for thereby adjusting said delaying means in relation of the position of said cutter means when said manually operable means is operated.

References Cited in the file of this patent

UNITED STATES PATENTS

| | | |
|---|---|---|
| 838,215 | Russel | Dec. 11, 1906 |
| 1,716,523 | Hopkins | June 11, 1929 |
| 1,758,436 | Fitzgerald | May 12, 1930 |
| 1,972,618 | Barber | Sept. 4, 1934 |
| 2,339,456 | Budlong | Jan. 18, 1944 |
| 2,362,437 | Galkin | Nov. 7, 1944 |
| 2,632,509 | Skillman | Mar. 24, 1953 |
| 2,815,075 | Braunstein et al. | Dec. 3, 1957 |